United States Patent [19]
Otagawa et al.

[11] Patent Number: 5,403,680
[45] Date of Patent: Apr. 4, 1995

[54] PHOTOLITHOGRAPHIC AND ELECTRON BEAM LITHOGRAPHIC FABRICATION OF MICRON AND SUBMICRON THREE-DIMENSIONAL ARRAYS OF ELECTRONICALLY CONDUCTIVE POLYMERS

[75] Inventors: Takaaki Otagawa, Fremont; Marc J. Madou; Leonor A. Wachsman, both of Palo Alto, all of Calif.

[73] Assignee: Osaka Gas Company, Ltd., Tokyo, Japan

[21] Appl. No.: 828,414

[22] Filed: Jan. 31, 1992

Related U.S. Application Data

[63] Continuation-in-part of Ser. No. 334,680, Apr. 6, 1989, Pat. No. 5,002,700, which is a continuation-in-part of Ser. No. 238,571, Aug. 30, 1988, Pat. No. 4,973,391, Ser. No. 599,002, Mar. 25, 1990, abandoned, and Ser. No. 675,091, Mar. 25, 1991, Pat. No. 5,187,034.

[51] Int. Cl.⁶ .............................................. H01M 4/60
[52] U.S. Cl. ................................. 429/213; 429/237; 204/290 R; 204/280; 204/291; 204/192.1; 205/122; 205/317; 205/188; 359/265; 359/266; 359/268; 359/273; 359/274; 359/275
[58] Field of Search ................. 204/291, 290 R, 294, 204/59 R, 72.1, 92.1, 192.11, 157.15, 157.62, 157.64; 429/213, 237; 359/265, 273, 274, 275, 268, 266; 252/500; 350/357, 355; 313/385; 427/13, 457, 458, 466, 473, 77

[56] References Cited

U.S. PATENT DOCUMENTS

| 4,895,705 | 1/1990 | Wrighton et al. | 204/290 F |
|---|---|---|---|
| 4,898,766 | 2/1990 | Tamamura et al. | 205/121 |
| 4,973,391 | 11/1990 | Madou et al. | 204/78 |
| 4,999,263 | 3/1990 | Kabata et al. | 429/131 |
| 5,002,700 | 3/1991 | Otagawa et al. | 252/500 |

OTHER PUBLICATIONS

Ivor Brodie et al., "The Physics of Microfabrication", *SRI International*, May 1992?, pp. 1–78.
Reginald M. Penner et al., "Controlling the Morphology of Electronically Conductive Polymers", *Journal of the Electrochemical Society*, Oct. 1986, pp. 2206.
Xiantong Bi et al., "An Electrically–Conductive Composite Prepared by Electrochemical Polymerization of Pyrrole into Polyurethane", *Synthetic Metals*, vol. 22, 1987, pp. 145–156, No month available.
Masayoshi Watanabe et al., "Polypyrrole/Polymer Electrolyte Bilayer Composites Prepared by Electrochemical Polymerization of Pyrrole Using Ion–Conducting Polymers as a Solid Electrolyte", *Chemistry Letters*, 1987, pp. 1239–1242, No month available.
Niwa, O. et al., Kobunshi Ronbunshu, vol. 44, #4, 1987, pp. 225–233, abstract only.

*Primary Examiner*—Kathryn Gorgos
*Attorney, Agent, or Firm*—Phillips Moore Lempio & Finley

[57] ABSTRACT

The present invention relates to a method to produce a thin film three dimensional microelectrode of an electrically conductive polymer having an organized array of identical microprotrusions, which method comprises:

(a) depositing at least one conductive metal thin film on an essentially smooth substrate,
(b) depositing a thin film of a micropositive photoresist on the surface of the at least one conductive metal thin film,
(c) subjecting the combination of step (b) to photolithographic or electron beam lithographic conditions with a mask capable of producing a metallic microwell,
(d) electrochemically polymerizing an electrically conductive polymer onto the conducting metal,
(e) removing the photoresist to produce the three dimensional microelectrode array of the electrically conductive polymer. Preferred electrically conductive polymers of step (d) are selected from polypyrrole or polyaniline. The methods wherein in step (d) the polymer is electrochemically polymerized using a constant current, or in step (d) the polymer is electrochemically polymerized using a constant potential, or in step (d), the polymer is electrochemically polymerized using a cyclic potential are preferred.

20 Claims, 15 Drawing Sheets

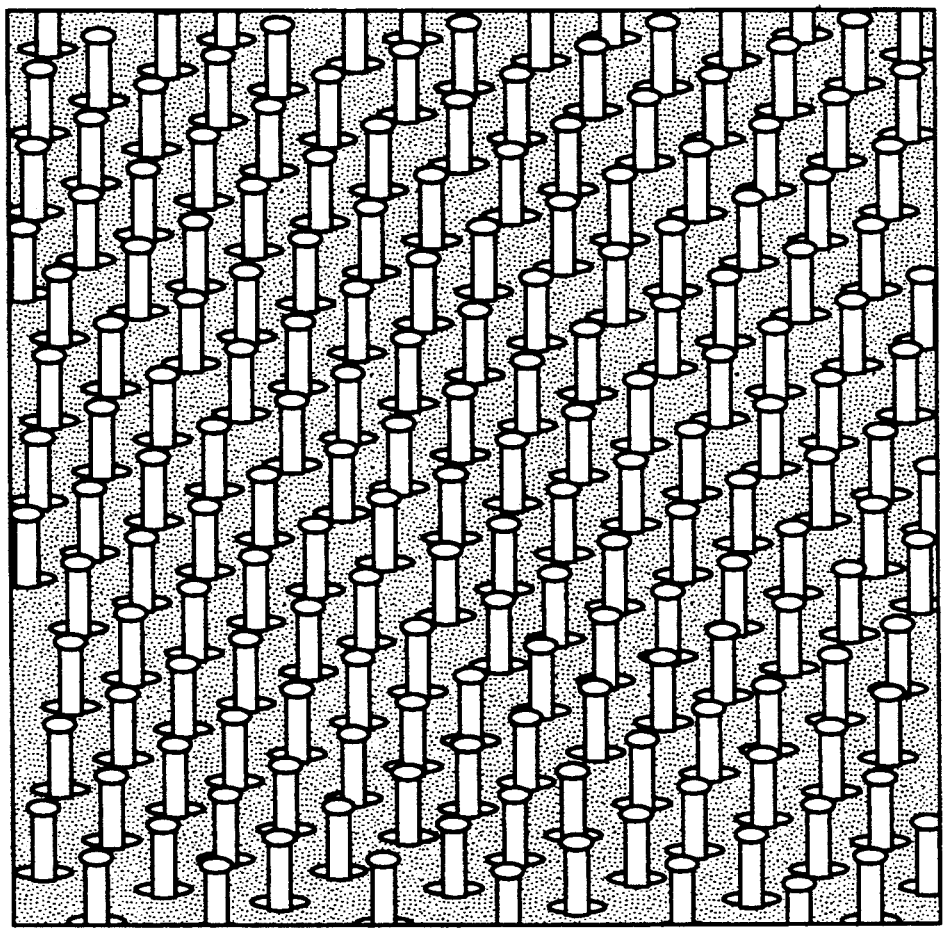
FIG._1

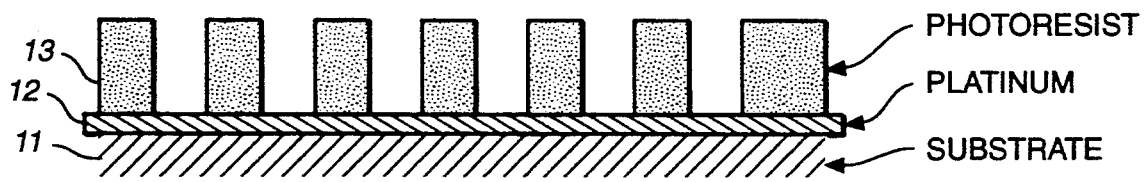
FIG._2A
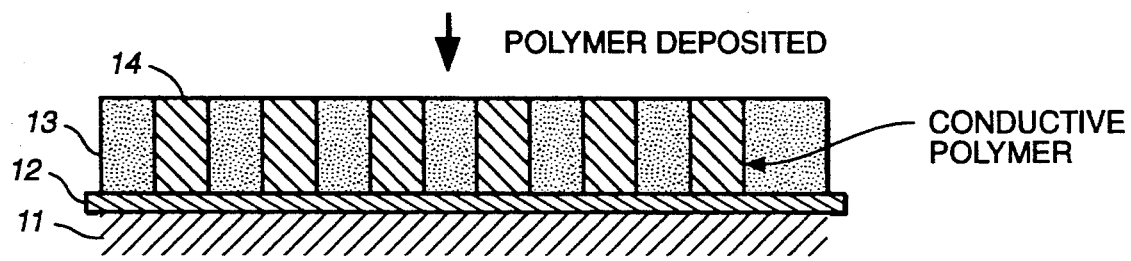
FIG._2B
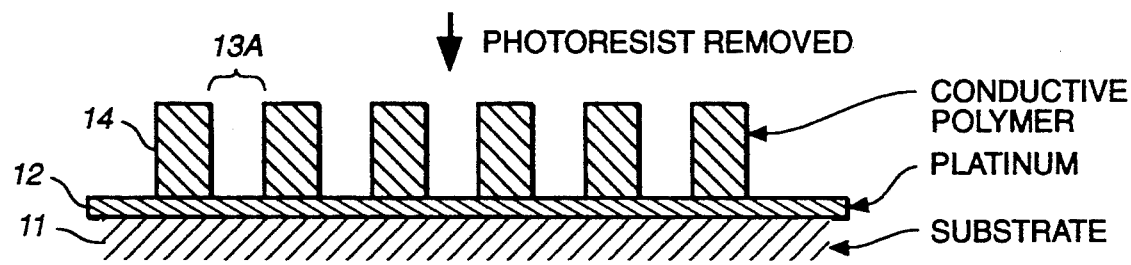
FIG._2C
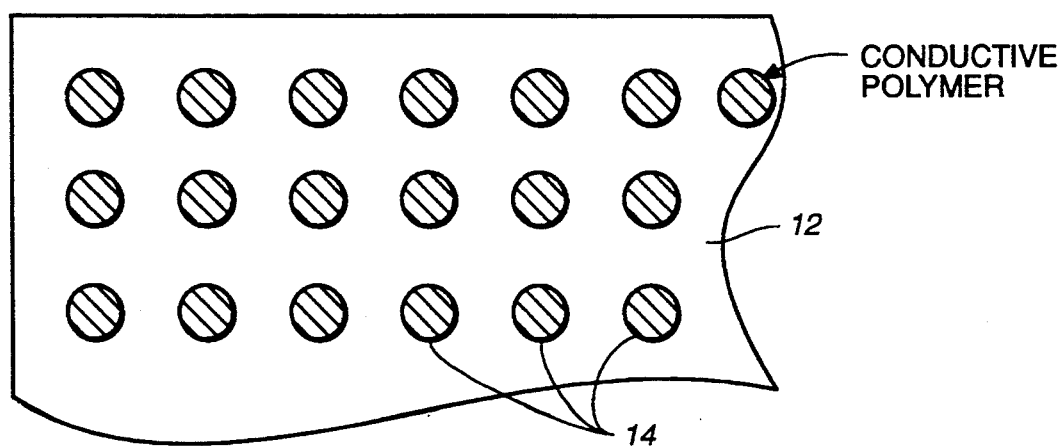
FIG._2D

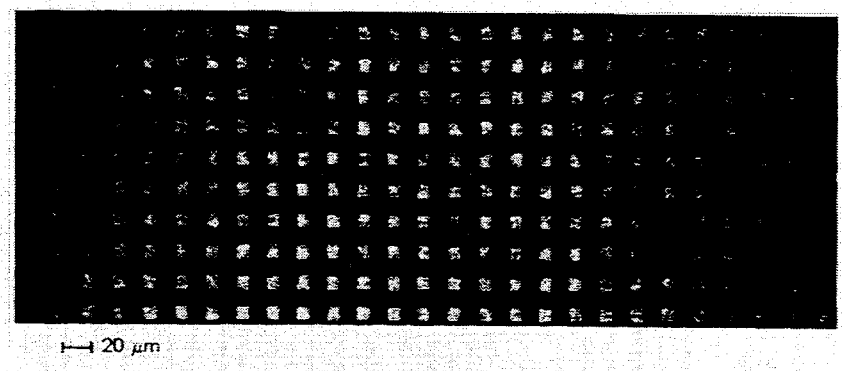
⊢⊣ 20 μm
*FIG._3A*
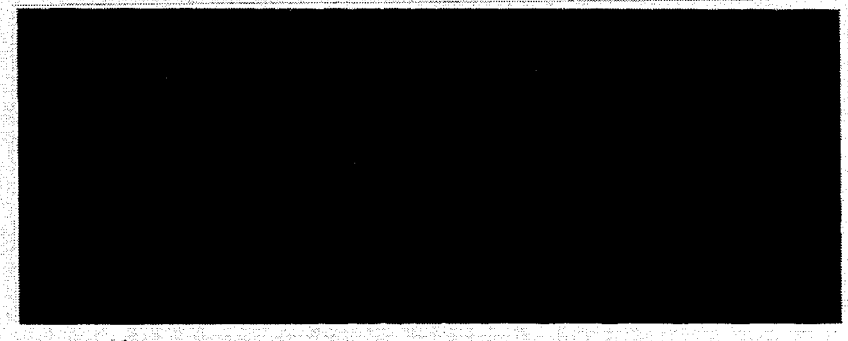
⊢⊣ 20 μm
*FIG._3B*
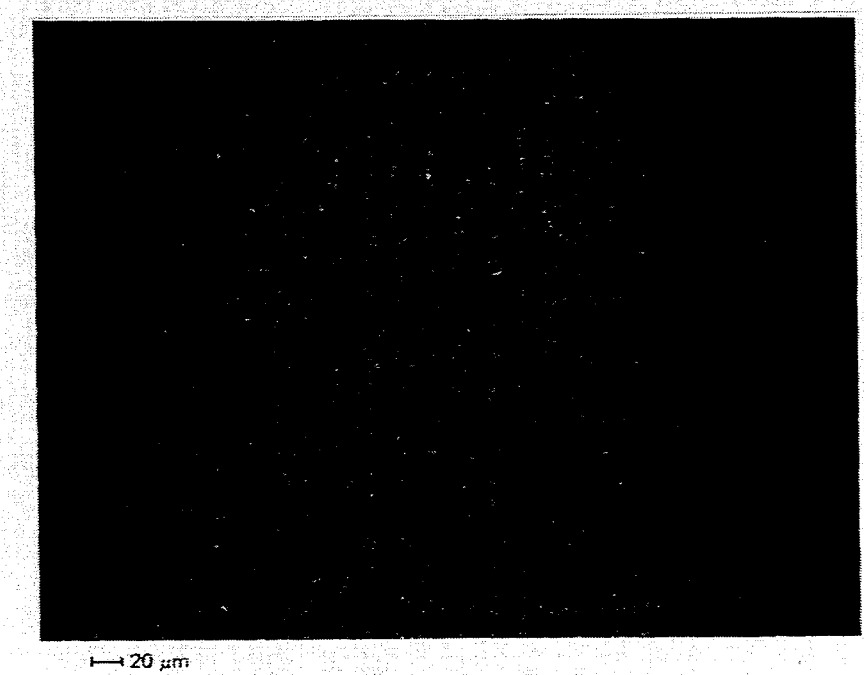
⊢⊣ 20 μm
*FIG._3C*

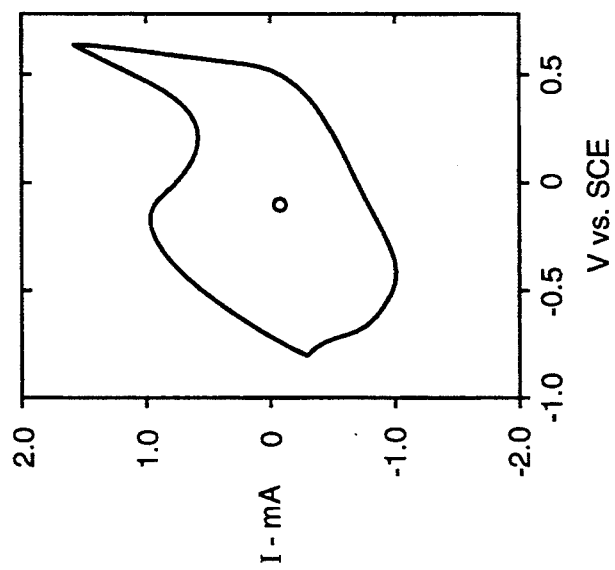
FIG._4B
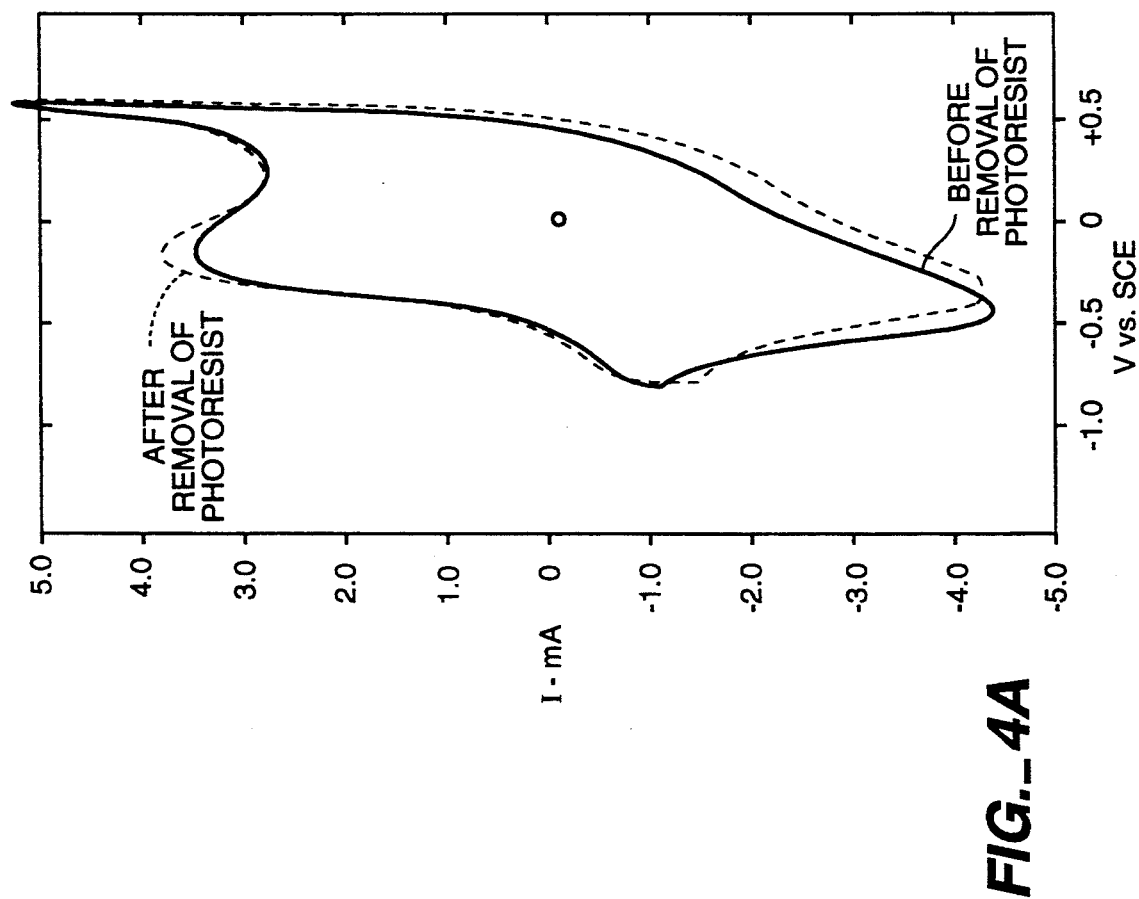
FIG._4A

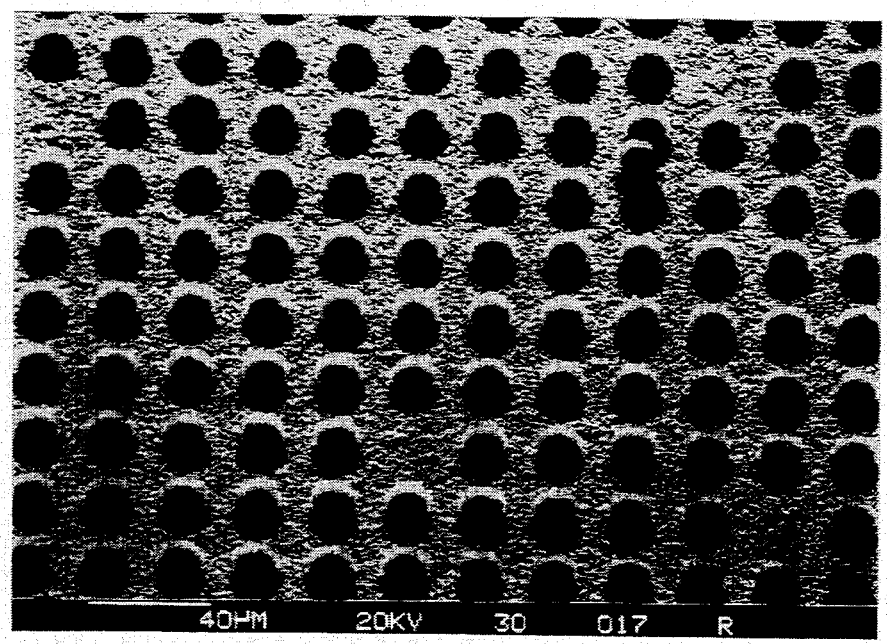
FIG._5A
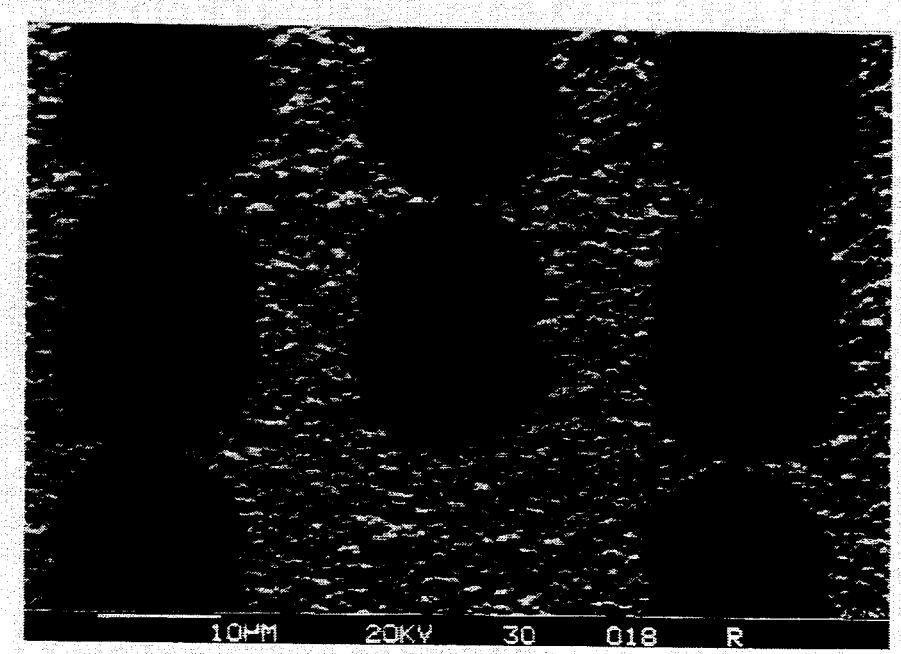
FIG._5B

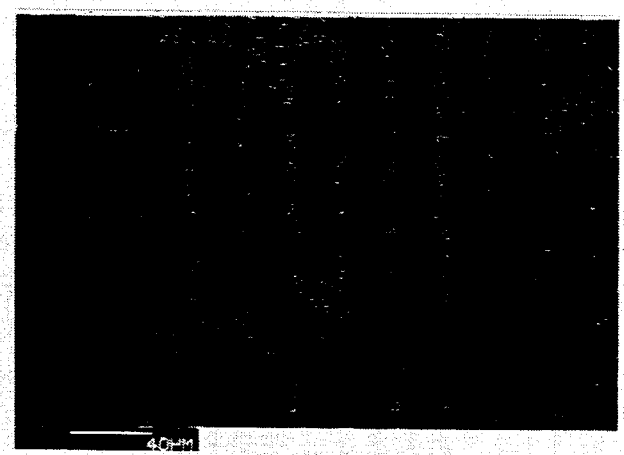
FIG._6A
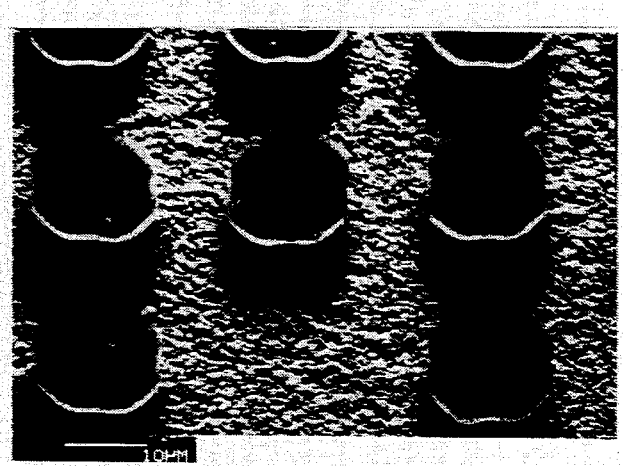
FIG._6B
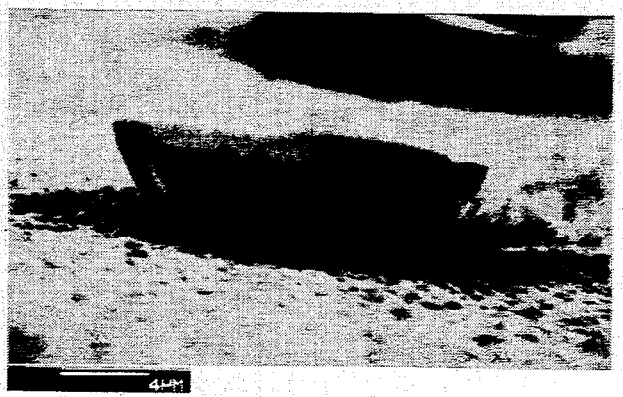
FIG._6C

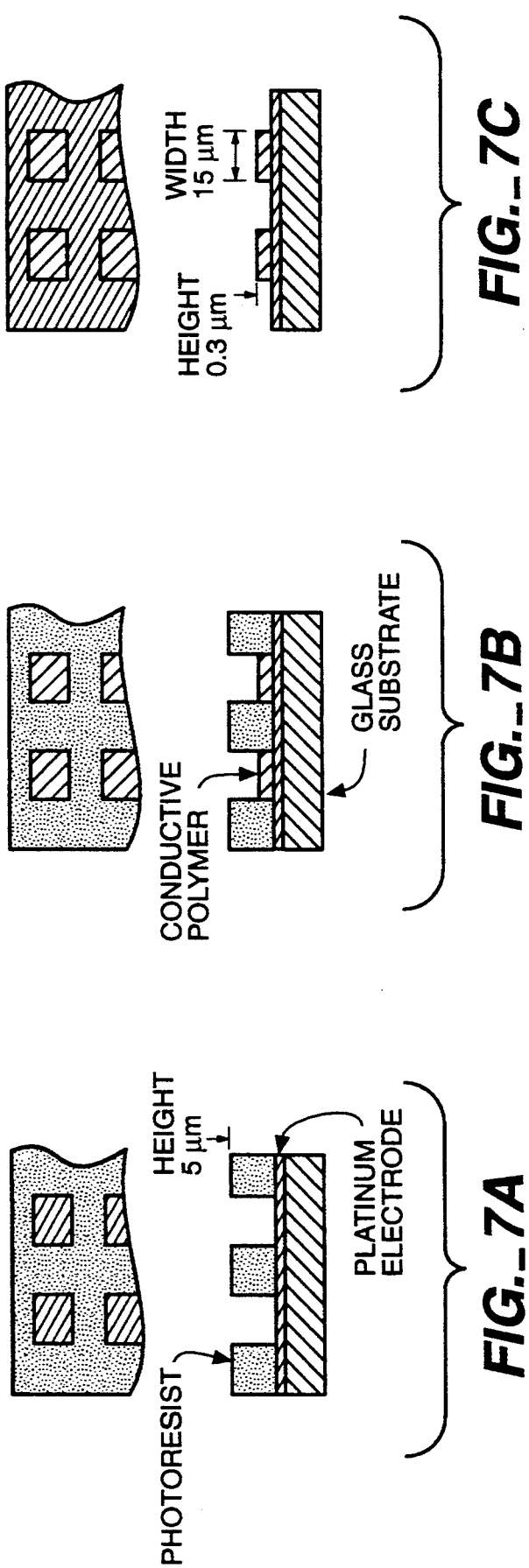

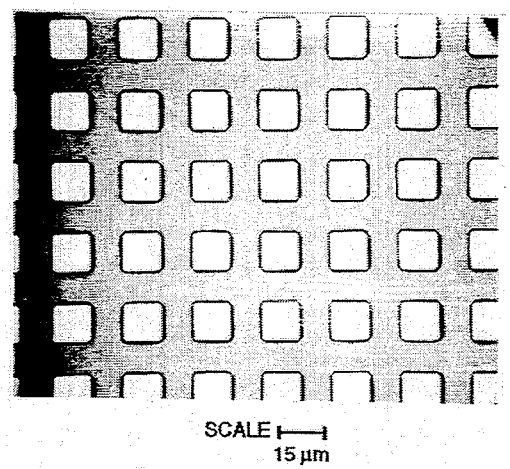
FIG._8A
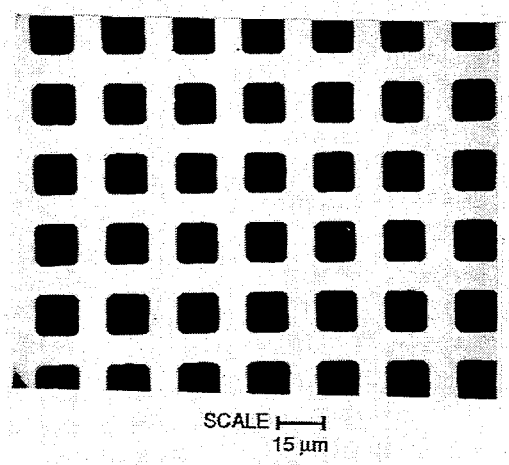
FIG._8B
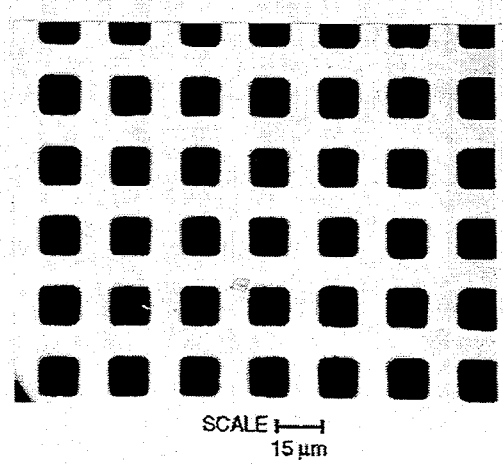
FIG._8C

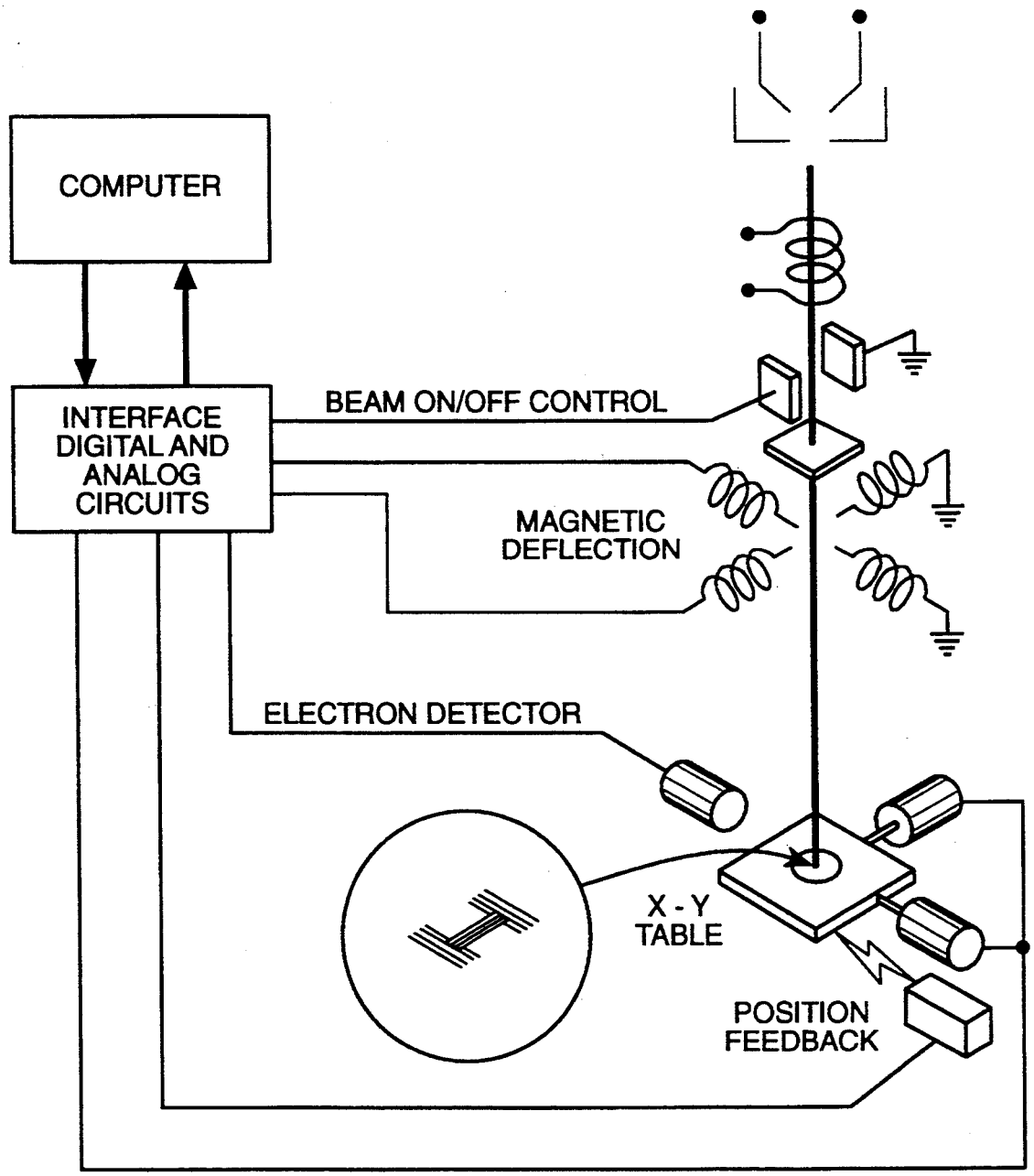
FIG._9

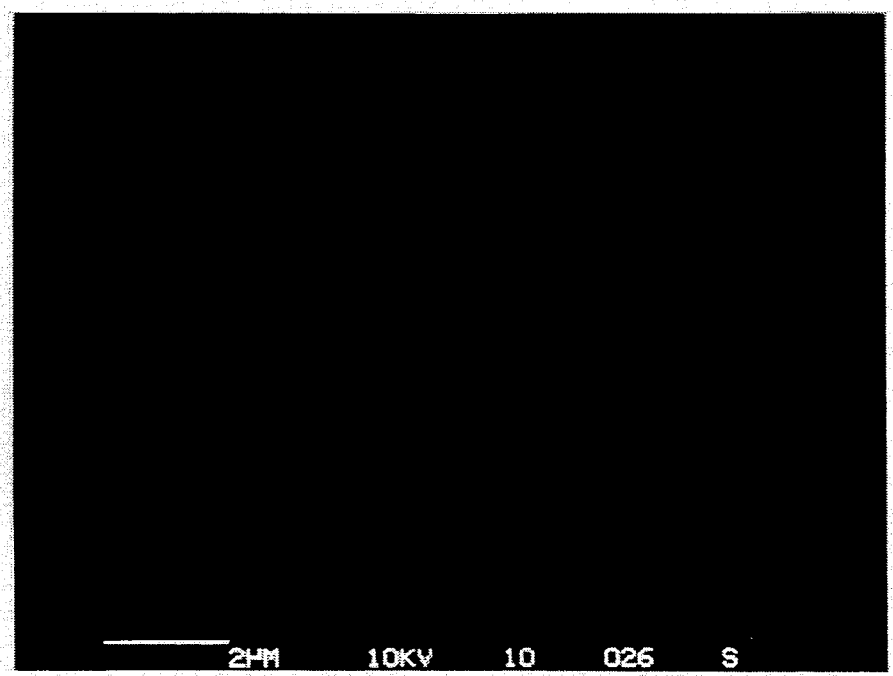
FIG._10A
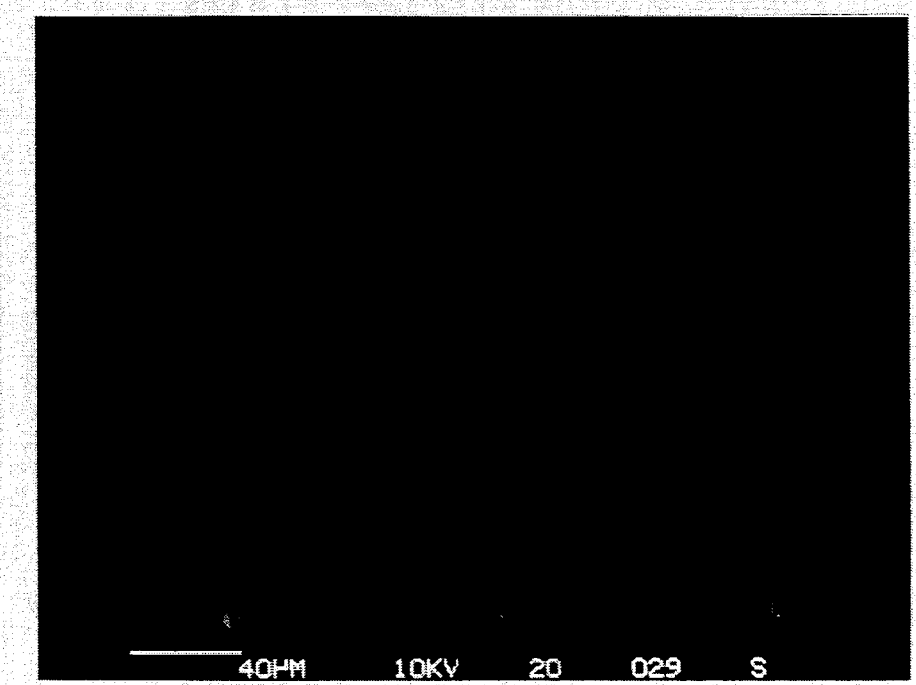
FIG._10B

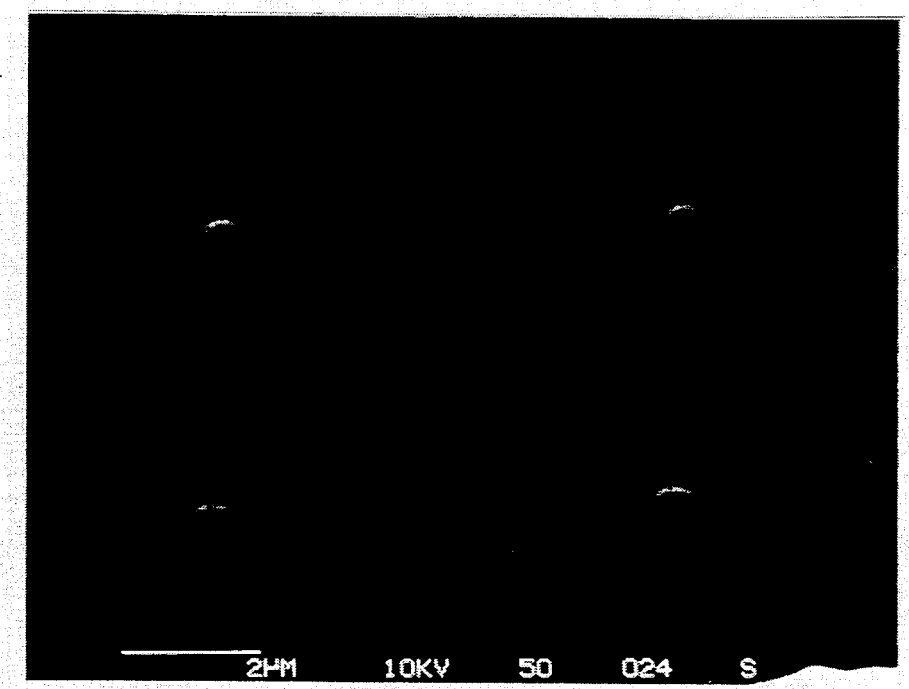
FIG._11A
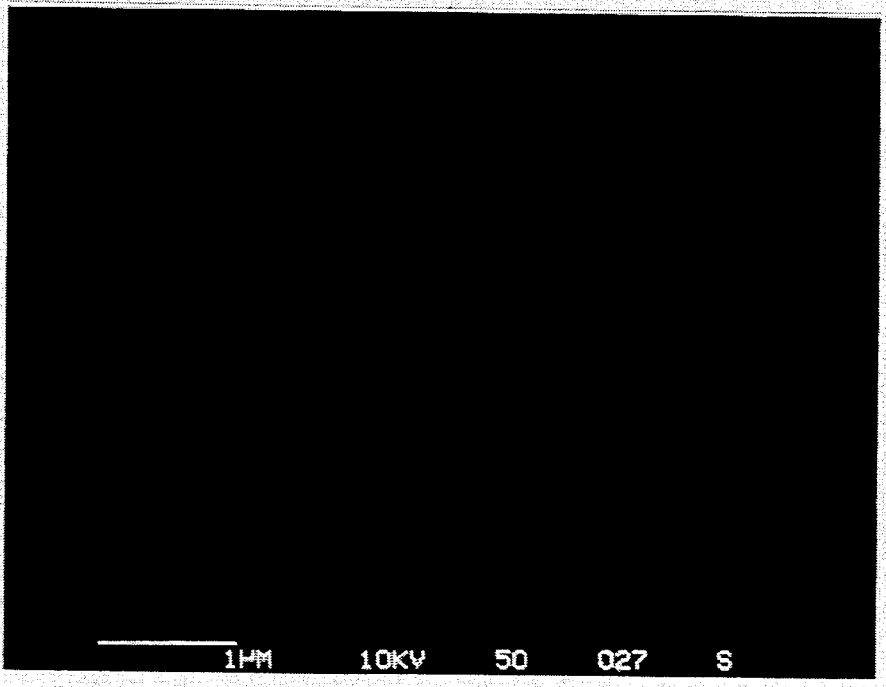
FIG._11B

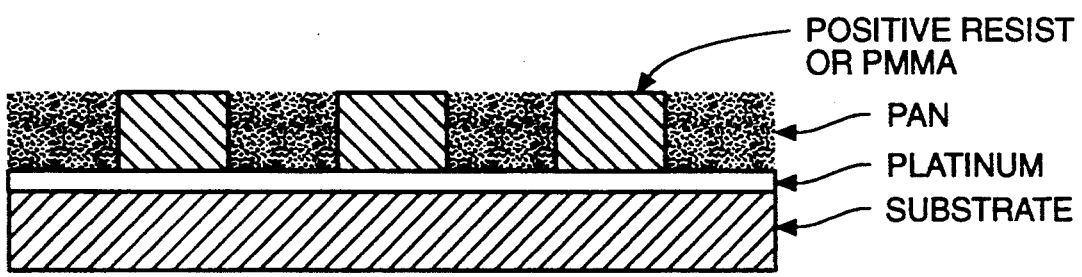
FIG._12A
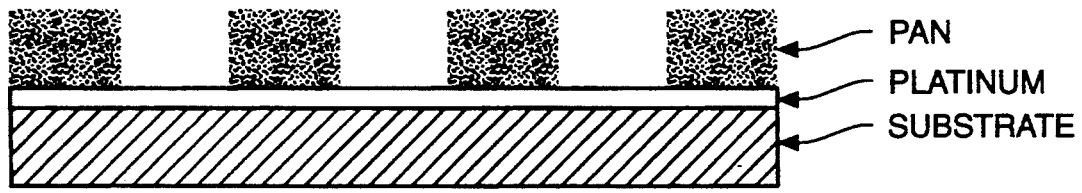
FIG._12B
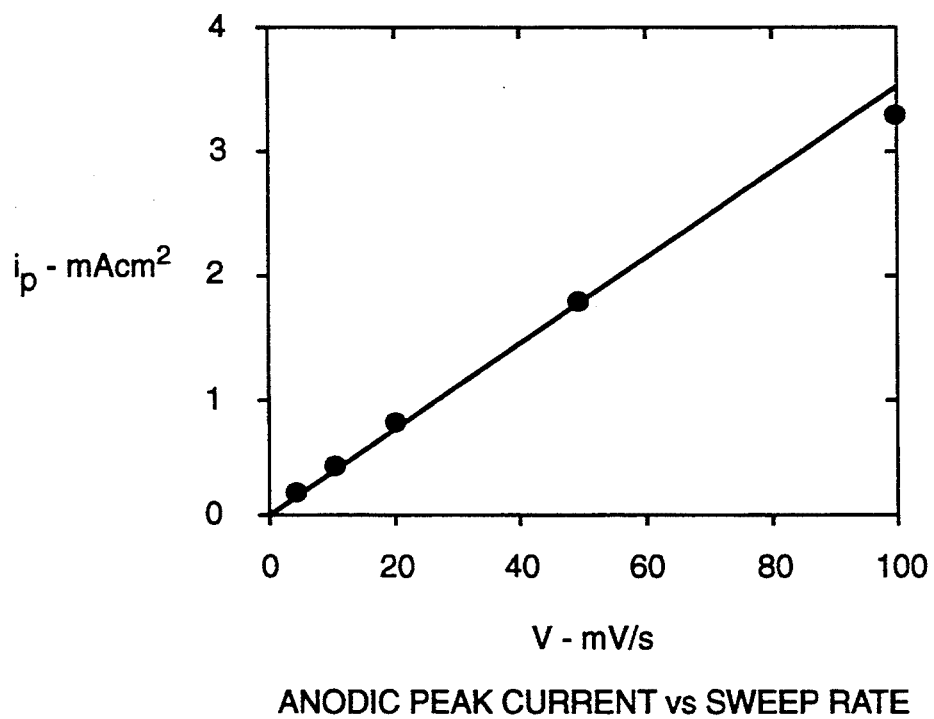
ANODIC PEAK CURRENT vs SWEEP RATE
FIG._16

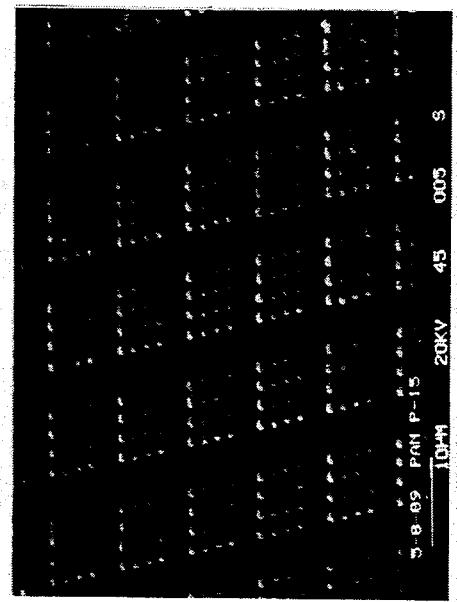
FIG._13B
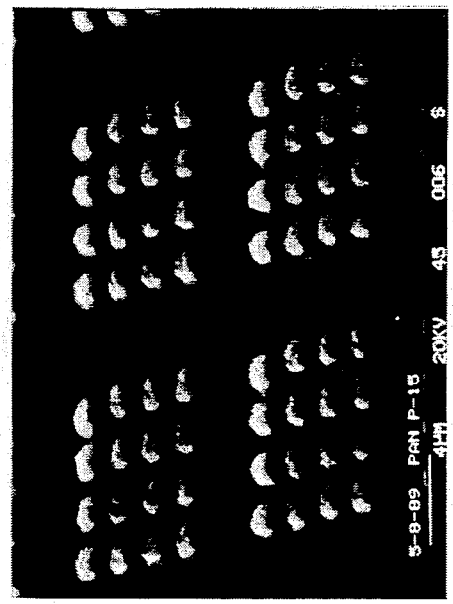
FIG._13D
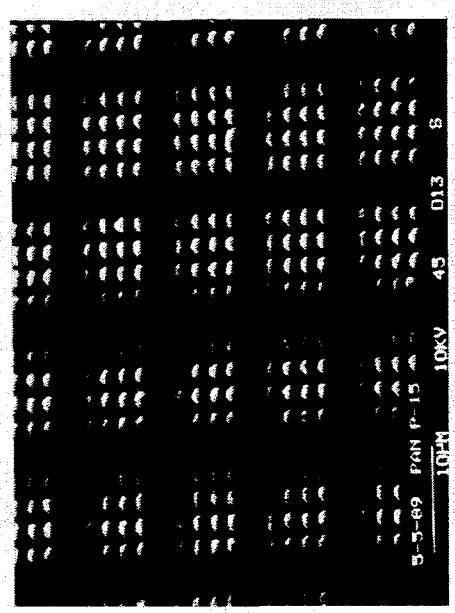
FIG._13A
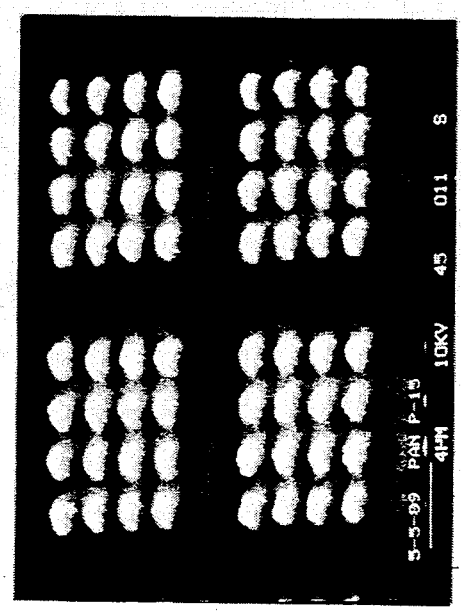
FIG._13C

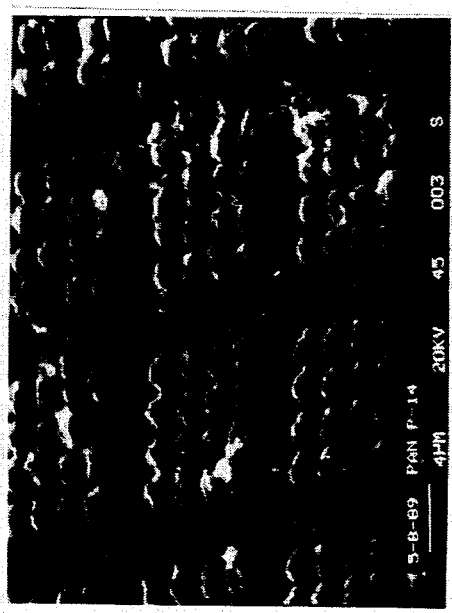
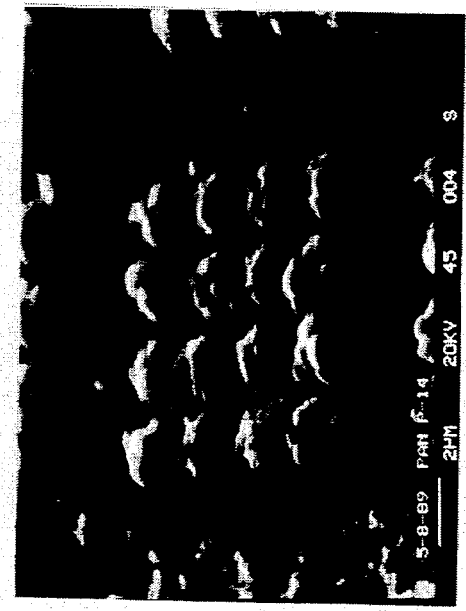
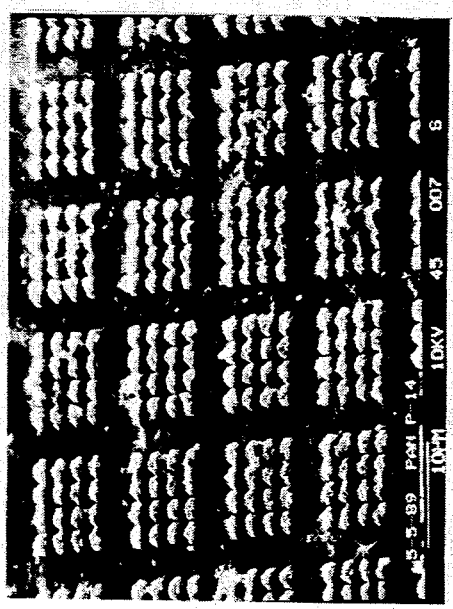
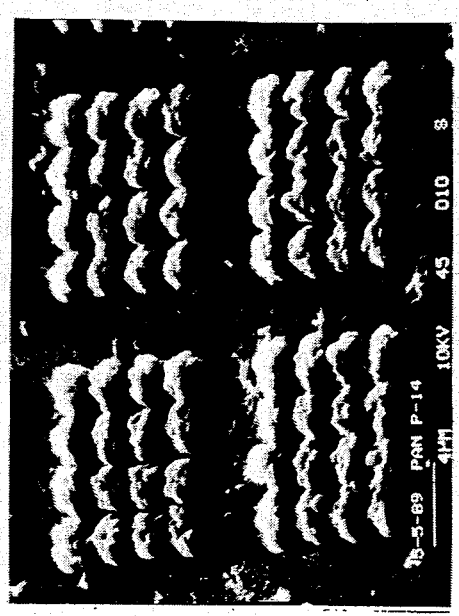
FIG._14A
FIG._14B
FIG._14C
FIG._14D

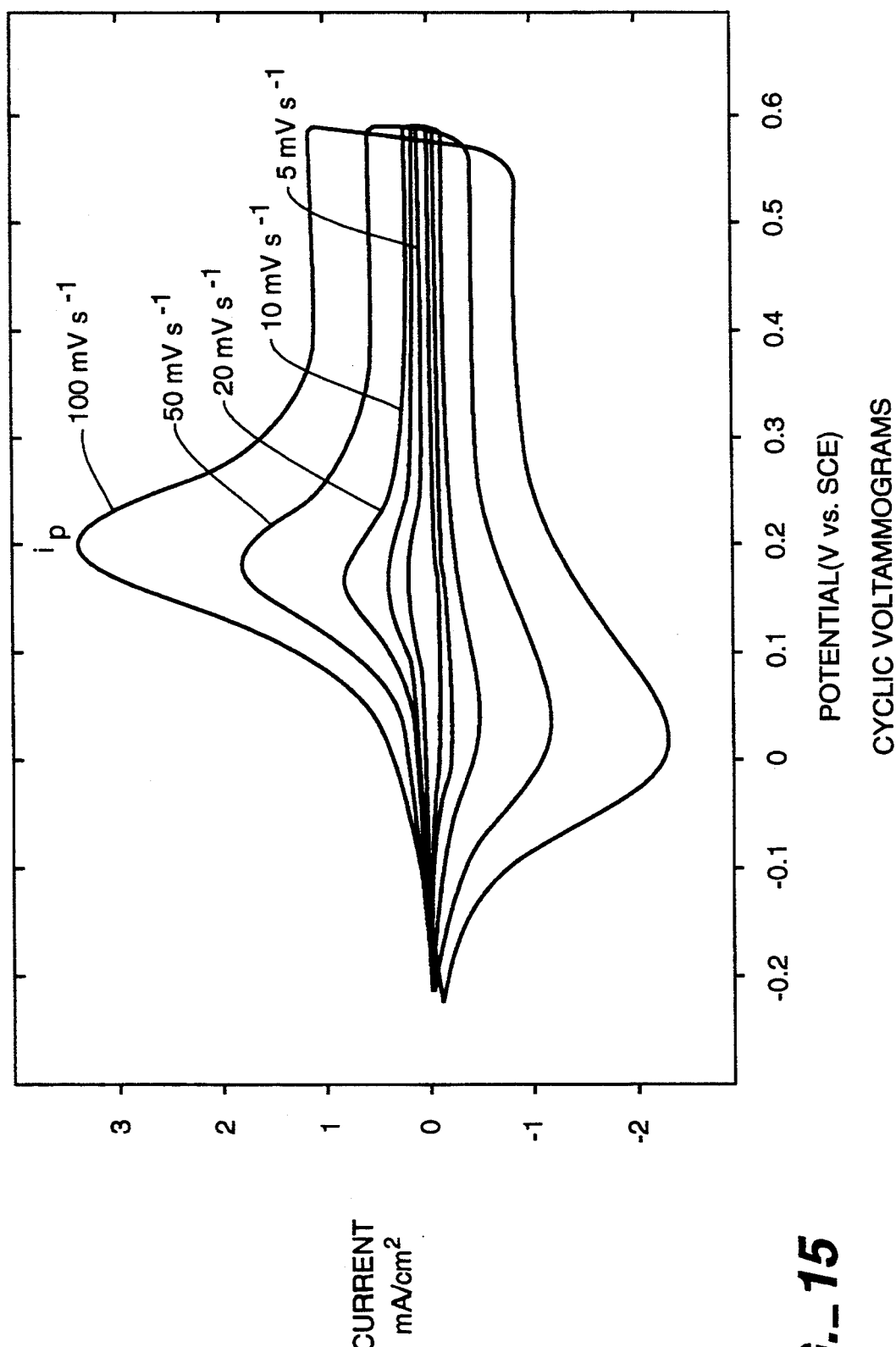
FIG._15

5,403,680

PHOTOLITHOGRAPHIC AND ELECTRON BEAM LITHOGRAPHIC FABRICATION OF MICRON AND SUBMICRON THREE-DIMENSIONAL ARRAYS OF ELECTRONICALLY CONDUCTIVE POLYMERS

RELATED APPLICATIONS

This application is a continuation-in-part of U.S. Ser. No. 334,680, filed Apr. 6, 1989, now U.S. Pat. No. 5,002,700, which is a continuation-in-part of U.S. Ser. No. 238,571, filed Aug. 30, 1988, now U.S. Pat. No. 4,973,391, and of U.S. Ser. No. 599,002, filed Mar. 25, 1990, now abandoned, and U.S. Ser. No. 675,091, filed Mar. 25, 1991, now U.S. Pat. No. 5,187,034, all of which are incorporated by reference in their entirety.

BACKGROUND OF THE INVENTION

1. Field of the Invention

The present invention relates to an organized regular micron and submicron three-dimensional microelectrode of an electrically conductive polymer having a well organized array of substantially identical formed microelectrode. More specifically, the invention concerns a electrochemically produced conductive polymer such as polyaniline or polypyrrole which is formed having a well organized micron and/or submicron array of regular microprotrusions from the surface of the polymer fabricated using a photolithographic and-/or electron beam photolithographic process and the electrochemical process for the manufacture thereof.

2. Description of Related Art

Three-dimensional polymer films are particularly interesting for battery and electrochromic applications because of possible enhancement of the rate of counter-ion diffusion and migration.

Some descriptions of the preparation of polyaniline and polypyrrole polymer films have appeared in the literature. Representative examples are described below:

M. Watanabe et al. disclose in *Chemical Letters*, Vol. 6, pp. 1239–1242, polypyrrole/polymer electrolyte bilayer composites which are prepared by the electrochemical polymerization of pyrrole using non-conducting polymers as a solid electrolyte.

X. Bi and Q. Pei disclose in *Synthetic Metals*, Vol. 22, pp. 145–156 (1987), the preparation of an electrochemical polymerization of pyrrole into a polyurethane.

M. J. Madou et al. disclose in U.S. Pat. No. 4,973,391 the preparation of electrically conducting phthalocyanine dope polymers of polyaniline which is specifically incorporated herein by reference.

Technology of the a general and specific nature is also disclosed in U.S. Serial No. 675,091, filed Mar. 25, 1991 and U.S. Ser. No. 599,002, filed Oct. 17, 1990, both of which are specifically incorporated herein by reference.

*Photolithography*—R. M. Penner and C. R. Martin, (1986) *Journal of the Electrochemical Society*, Vol. 133, No. 10, pp. 2206–2207, report a simple way of fabricating a fibrillar/microporous (i.e., microcylinder) polypyrrole membrane using a Nucleopore porous membrane that is soluble in methylene chloride. Various diameters of polymer fibrils ranging from 1000 Angstroms to 12 micrometers are possible, the resulting polymer elements are not evenly spaced (and therefore are termed an "ensemble" rather than "array") and the ensemble pattern is not reproducible.

O. M. Niwa et al. (in *Kobunshi Ronbunshu*, Vol. 44, No. 4, pp. 225–233 (1987)) report the fabrication of a polymer alloy film consisting of isolated arrays of polypyrrole within an insulating polymer film (e.g. polyvinylchloride) to obtain a free-standing polymer film with a high transparency and a highly anisotropic conductivity. In this approach, however, it is difficult, if not impossible, to produce a controlled, reproducible pattern (array) of polypyrrole because elements in the array tend to overgrow and spread within the insulating film during the electrochemical polymerization process.

Electron-Beam-Lithography—Electron-beam lithography systems are conventional in the art (see I. Brodie and J. Murray, (1982) *The Physics of Microfabrication*, Plenum Press, New York, N.Y., particularly p. 27). Electrons are used by scanning the beam to generate patterns directly from computer programs. The electron optics associated with electron-beam pattern-generation equipment are similar to those used in electron microscopy. For example, a scanning electron beam is normally used because of its ability to create high-resolution patterns (linewidth $\leq$ 5000 Angstroms), its programmability, its large depth of focus (about 10 micrometers), and its capability of providing focus and registration via a scanning electron microscope.

All references, articles, patents, patent applications, standards, reviews and the like cited in this application are incorporated by reference in their entirety.

None of these references individually or collectively disclose the present invention.

It would be very useful to have a process to produce a conductive polymeric electrode having an organized array of micron or submicron protrusions, which array is useful, for instance, electrochromic or in battery electrode applications.

SUMMARY OF THE INVENTION

The present invention relates to a method to produce a thin film three dimensional microelectrode of an electrically conductive polymer having an organized array of substantially identical micron and submicron protrusions, which method comprises:

(a) depositing at least one conductive metal thin film on an essentially smooth substrate, (b) depositing a thin film of a micropatterned photoresist on the surface of the at least one conductive metal thin film, (c) subjecting the combination of step (b) to photolithographic and/or electron beam lithographic conditions with a mask capable of producing a metallic microwell, (d) electrochemically polymerizing an electrically conductive polymer and optionally a dopant onto the conducting metal, and (e) removing the resist layer present to produce the three dimensional microelectrode array of the electrically conductive polymer.

Preferred electrically conductive polymers of step (d) are selected from polypyrrole or polyaniline, preferably polyaniline.

The methods wherein in step (d) the polymer is electrochemically polymerized using a constant current, or in step (d) the polymer is electrochemically polymerized using a constant potential, or in step (d), the polymer is electrochemically polymerized using a cyclic potential, are preferred.

In one embodiment, the lithographic process is a photolithographic process.

In another embodiment, the lithographic process is an electron-beam lithographic process.

BRIEF DESCRIPTION OF THE DRAWINGS

FIG. 1 is an isometric depiction of the finished (completed) three-dimensional micron or submicron array of an electronically conducting polymer.

FIGS. 2A–D describe the steps of a process to prepare the three-dimensional array found in FIGS. 2A to 2D.

FIG. 2A is a cross-sectional view of the photoresist deposited on the conductive metal which is deposited on the substrate.

FIG. 2B is a cross-sectional view of FIG. 2A after the deposition of the electronically conducting polymer.

FIG. 2C is a cross-sectional view after removal of the photoresist of FIG. 2B.

FIG. 2D is a top plan view of the three-dimensional array of FIG. 2C.

FIG. 3A is a scanning electron micrograph (SEM), a photograph of the microarray of platinum microwells in the photoresist layer at a 20 micrometer scale.

FIG. 3B is a SEM of the micro array before removal of the photoresist at a 20 micrometer scale.

FIG. 3C is a SEM of the microarray after removal of the photoresist at a 20 micrometer scale.

FIG. 4A is a typical voltammetric curve of three-dimensional PPY/Ni-Pc electrode at 50 mV/s scan rate in 0.5M aqueous sodium sulfate solution.

FIG. 4B is a typical voltammetric curve for a regular flat PPY/Ni-Pc electrode 20 mV/s scan rate in aqueous 0.5M sodium sulfate solution.

FIG. 5A is a scanning electron micrograph of a three-dimensional microelectrode array of polypyrrole/Ni-Pc (10 potential cycles) at a 40 micrometer scale.

FIG. 5B is a SEM of FIG. 5A at a 10 micrometer scale.

FIG. 6A is a top plan scanning electron micrograph (SEM) of a three-dimensional microelectrode array of poly pyrrole/NiPc (20 potential cycles) at a 40 micrometer scale.

FIG. 6B is a top plan SEM of FIG. 6A at a 10 micrometer scale.

FIG. 6C is a side perspective SEM of FIG. 6A at a 4 micrometer scale.

FIGS. 7A–D describe a procedure for fabricating a two-dimensional array of a polyaniline electrode.

FIG. 7A is a cross-sectional view before polymerization.

FIG. 7B is a cross-sectional view after polymerization.

FIG. 7C is a cross-sectional view after the photoresist is removed.

FIG. 7D is a cross-sectional depiction of the ion movement showing the conventional flat electrode for less diffusion than the two dimensional array of microelectrodes.

FIG. 8A is a SEM of the two-dimensional arrays of polyaniline/Ni-Pc in the photoresist layer prior to polymerization at a 15 micrometer scale.

FIG. 8B is a SEM of FIG. 8A before the photoresist is removed at a 15 micrometer scale.

FIG. 8C is a SEM of FIG. 8B after the photoresist is removed at a 15 micrometer scale.

FIG. 9 is a schematic illustration of a conventional electron-beam lithography system.

FIG. 10A is a SEM of a type 2a array using a polymethylmethacrylate pattern with electron-beam lithography at a 2 micrometer scale.

FIG. 10B is a SEM of a type 2b array, 1350 positive resist pattern by photolithography.

FIG. 11A is a SEM of a submicron three-dimensional electrode structure of polyaniline/tosylate fabricated by electron beam lithography at a 2 micrometer scale.

FIG. 11B is a SEM of FIG. 11A at a 1 micrometer scale.

FIGS. 12A–B show a cross-sectional view of the fabrication of three-dimensional arrays of a self-doped polyaniline (PAN/Ts) using electron beam lithography with all Type 2 procedures.

FIG. 12A is before removal of the positive resist. (e.g. PMMA).

FIG. 12B is after removal of the positive resist (e.g. PMMA).

FIGS. 13A–D are a series of 4 SEM of three-dimensional submicron arrays of polyaniline/tosylate (PAN-PIS) electrode made with uniform-hole-size PMMA pattern.

FIG. 13A is before removal of PMMA at a 10 micrometer scale.

FIG. 13B is FIG. 13A at a 4 micrometer scale.

FIG. 13C is after removal of PMMA at a 10 micrometer scale.

FIG. 13D is FIG. 13C at a 4 micrometer scale.

FIGS. 14A–D are a series of 4 SEM of three-dimensional submicron arrays of polyaniline/tosylate (PAN/P14) electrode made with unusually large-hole PMMA pattern.

FIG. 14A is before removal of PMMA at a 10 micrometer scale.

FIG. 14B is FIG. 14A at a 4 micrometer scale.

FIG. 14C is after removal of PMMA at a 4 micrometer scale.

FIG. 14D is FIG. 14C at a 2 micrometer scale.

FIG. 15 is a cyclic voltammogram for a three-dimensional submicron array of polyaniline/tosylate (PAN/P15) before removal of PMMA in 1M sodium sulfate at pH of 1.2.

FIG. 16 is an anodic peak current as a function of sweep-rate for the array of FIG. 15.

DETAILED DESCRIPTION OF THE INVENTION AND PREFERRED EMBODIMENTS

Definitions.

"PAN/Ts" refers to the tosylate doped polyaniline.

"Polyaniline" or "(PAN)" refers to the polymeric electronically conducting polymer.

"Pc" refers to tetrasulfonated metal phthalocyanine.

"Polypyrrole" (PPY) refers to the polymeric electronically conducting polymer.

"PPY/Ts" refers to the tosylate doped polypyrrole.

"Tosylate" or "Ts" refers to para-toluenesulfonic acid, usually used as a dopant.

Photolithography—Three-dimensional microelectrode arrays of electronically conductive polymers are produced by means of photolithographic microprocessing for use of such a structure as a battery electrode (so as to increase the charge capacity, i.e., current density) or as an electrochromic electrode (so as to obtain faster switching films). In the fabrication of such a three-dimensional microstructure of a conductive polymer, a part of a photoresist layer (in between the grown polymer) must be etched away using a resist stripping liquid after the electrochemical polymerization is completed, and the polymer layer must withstand the etching process.

In a preliminary examination, the compatibility of conductive polymers (polyaniline, PAN and polypyrrole, PPY) and various chemicals and solvents used in the photolithographic processing were evaluated. Polyimide was chosen as the photoresist primarily because it is possible to build up a thick (>50 micrometer) layer of polyimide. Such a thick layer of photoresist would be required to fabricate tall micropost arrays of a conductive polymer with a high electrochemical surface area suitable for a battery electrode. The stripper liquids typically used for polyimide are N-methylpyrrolidone and Losoline HTR stripper Ciba-Giegy, Inc. of Santa Clara, Calif.

The following is a summary of the experimental results:

A piece of 140 micrometer thick, fully cured polyimide (Ciba-Geigy, Summit, N.J.) was immersed in a 20% sulfuric acid solution (because an acidic solution is required for the polymerization of aniline) for two days; no degradation was observed.

The PPY remained unchanged in N-methylpyrrolidone at about 80° to 100° C. for at least 5 minutes, but it started to blister in Losoline solvent (at 80° C.) after approximately 1 minute.

The PAN was completely dissolved immediately following immersion in either of the strippers at 80° C.

In the presence of acetone for about 1 minute, PPY remains perfectly intact and PAN remains almost intact (a slight dissolution of PAN was observed).

These results suggest that the fabrication of a thick (>50 micrometers) three-dimensional-structure of a conductive polymer by using polyimide is feasible for polypyrrole, but not for polyaniline. The latter result, however, suggests that it would be feasible to fabricate of PPY or PAN arrays with thickness 2 to 5 micrometers using a regular positive photoresist. Polymer arrays of polypyrrole using a regular positive photoresist are fabricated, which can be easily removed with acetone. The thickness of the polymer arrays is limited to the resist layer of between about 2 to 5 micrometers.

FIG. 1 is an isomeric depiction of a three-dimensional microelectrode array of an electronically conducting polymer.

FIGS. 2A to 2D illustrate the steps of the fabrication process of three-dimensional microelectrode arrays of a conductive polymer, specifically:

A smooth ceramic (e.g. 99.6% aluminum oxide substrate, Kyocera Type A493) 11 was used as the substrate. A chromium adhesion layer of approximately 500 Angstroms was deposited first, using $CrO_3$, followed by a layer approximately 6000 Angstroms of platinum 12. The platinum is sputtered in a vacuum of $2 \times 10^{-6}$ torr in a conventional Materials Research Corporation (MRC) sputtering system with the substrate being water-cooled. The metallized substrate 11 and 12 was then coated with a layer of about 5 micrometers of Shipley 1650 micropositive resist 13. The microelectrode patterning to form two-dimensional platinum microwell arrays in the photoresist layer (FIG. 2A) was done by conventional photolithography using a piece of 1000-mesh nickel screen as the mask. Each platinum "microwell" 13A not covered by the photoresist layer is approximately $50 \times 50$ micrometers. The exposed individual platinum microwells 13A are electrically connected through the platinum layer on the substrate and are separated and insulated by the photoresist.

The next step is the electrochemical polymerization of monomer e.g. pyrrole (or aniline) onto the platinum at the bottom of the microwell arrays (FIG. 2B) by a conventional cyclic potential method. A solution of 0.2 M pyrrole containing 1 mM nickel-tetrasulfonatedphthalocyanine (Ni-Pc) in the tetra sodium tetrasulfonate salt form was used, and the potential was cycled between $-1.0$ and $+1.5$ V vs. SCE at a scan rate of 50 mV/s until the desired thickness of PPY was achieved.

After the electrochemical polymerization of the conductive polymer 14, the photoresist 13 was removed by rinsing thoroughly with acetone to achieve three-dimensional microelectrode arrays of an electronically conductive polymer (FIG. 2C). FIG. 2D is a top plan view of the organized array of microprotrusions of conductive polymer.

The three-dimensional arrays 14 of polypyrrole films were electrochemically synthesized and characterized to determine usefulness and application of the novel three-dimensionally structured conductive polymer electrode.

FIG. 3 presents optical microscope pictures of various stages of the fabrication. FIG. 3A shows the arrays of platinum square microwells before the electrochemical polymerization (cf. FIG. 2A); FIGS. 3A and 3C show the top view of a three-dimensional PPY/Ni-Pc microelectrode arrays before and after removing the photoresist layer, respectively. Although the square shaped rim of each PPY/Ni-Pc microelectrode (FIG. 3B) was lost during the removal of the photoresist (FIG. 3C), FIG. 3 clearly demonstrates that the polypyrrole film withstood the fabrication process to yield arrays of circular (cylindrical) microelectrodes.

FIG. 4A compares the cyclic voltammograms in 0.5 M sodium sulfate before and after the removal of the photoresist, confirming that the three-dimensional PPY/Ni-Pc structure remains intact after the removal of the resist. Moreover, the oxidation and reduction peak observed on the three-dimensional polypyrrole structure are well-defined and exhibit more electrochemical reversibility than the peaks associated with a conventional "flat" PPY/Ni-Pc film, in which the oxidation and reduction peaks are broader and more widely separated (see FIG. 4B). While not wanting to be bound by theory, it appears that the observed better electrochemical behavior on the three-dimensional polymer structure is attributable to faster rates of ion transport (especially the rate of counter-ion diffusion within the polymer) because the polymer chains are oriented into narrow, more organized structures, and also because more "sites" for the ion transport are exposed to the solution by the organized microprotrusions.

FIGS. 5A and 5B and 6A, 6B and 6C are scanning electron micrographs which compare the surface morphology of two three-dimensional PPY/Ni-Pc microelectrode array structures with different thickness, namely, with 10 potential cycles and 20 potential cycles (approximately 5 micrometers), respectively. FIGS. 5A and 5B present magnified views of the three-dimensional arrays of PPY/Ni-Pc shown in FIG. 3C. The SEM pictures in FIGS. 5A and 5B and 6A, 6B and 6C clearly show that the polymers are grown as a three-dimensional microelectrode structure. There are some missing polymer poles that are caused by poor adhesion of the polymer to the substrate. The scanning electron micrographs also show that the morphology of the polymer depends on the polymerization time (number of potential cycles during the electrochemical polymerization). When the number of cycles is increased (FIG. 6), the polymer became more dense and also grew thicker. When a constant potential of +0.7 V vs. SCE was applied for one hour instead of a cyclic potential, the resulting three-dimensional PPY/Ni-Pc arrays were very flaky with cracks and were partly overgrown in an irregular manner.

Two-Dimensional Microelectrode Arrays of Polyaniline—The electrochromic properties of two-dimensional microelectrode arrays of polyaniline were examined. The two dimensional-microelectrode-array polymer film was prepared on the transparent platinum electrode, which was first patterned by the PMMA-photoresist. The photoresist was removed by a stripper liquid, such as acetone, after the polymer was electrochemically deposited. Because, acetone also partly dissolves polyaniline, only two-dimensional (i.e. flat) microstructures-rather than three-dimensional-were made. The novel two-dimensional polymer electrode exhibits a faster response time as a result of an enhanced diffusion rate. The procedure to fabricate the two-dimensional-microelectrode-array polymer film is illustrated in FIGS. 7A, 7B and 7C.

The following films were prepared in a solution containing 2 M HCl and 1 M aniline:

Film 1: +0.1mA/$cm^2$(0.024C/$cm^2$-4 minute) on transparent platinum electrode.

Film 2: +0.05mA/$cm^2$(0.012C/$cm^2$-4 minute) on two-dimensional microelectrode array.

Film 3: +0.1mA/$cm^2$(0.018C/$cm^2$-3 minute) on transparent platinum electrode.

The electrochromic properties of the films were characterized in 1 M HCl. FIG. 8A, 8B and 8C show optical microscope pictures of various stages of the fabrication of Film 2 electrode. The individual two-dimensional microelectrodes are about 20×20 micrometers. FIG. 8C shows that two-dimensional-microelectrode-arrays of polyaniline film maintain a reasonably good mechanical integrity after the photoresist is removed. Films 1 and 2 were expected to have the same thickness because half of the surface of Film 2 is covered with photoresist. Table 1 summarizes response time and intensity of the color change (in parentheses).

TABLE 1

COMPARISON OF ELECTROCHROMIC RESPONSES ON TWO-DIMENSIONAL-MICROELECTRODE ARRAYS AND FLAT POLYANILINE ELECTRODES

| Film | Wavelength (nm) | Response Time(s) | Intensity of Color Change (V) |
|---|---|---|---|
| 1: Standard Flat | 550 | 0.5 | 5 |
|  | 600 | 0.5 | 10 |
|  | 650 | 0.6 | 8 |
|  | 700 | 0.5 | 10 |
| 2: Two-dimensional | 550 | 0.2 | 3 |
| microelectrode | 600 | 0.2 | 7 |
| arrays | 650 | 0.2 | 5 |
|  | 700 | 0.2 | 6 |
| 3: Thin flat | 550 | 0.1 | (—) |
|  | 600 | 0.1 | (—) |
|  | 650 | 0.2 | (5) |
|  | 700 | 0.2 | (6) |

Compared to the response time of 0.5 sec on the flat polyaniline electrode of Film 1, which has the same thickness, the two-dimensional electrode gave a faster response time of 0.2 s at all the wavelengths studied (550 to 700 nm). The two-dimensional-microelectrode-arrays of polyaniline was not as stable over time as Film 1, probably because the stripper liquid may have partly degraded the polyaniline or the diffusion rate of oxygen may be faster in the two-dimensional-microelectrode-arrays of polyaniline. The two-dimensional-microelectrode-array electrode also showed less intensity change, because the polymer area of Film 2 is almost half that of Film 1.

The observed performance of the two-dimensional-microelectrode-array electrode is, in fact, somewhat comparable to the performance obtained with a thinner (half as thick) flat polyaniline electrode Film 3. However, the thinner flat polyaniline film was too fragile to use when wavelengths of 550 and 600 nm were employed.

It is possible to produce ultrathin polyaniline films that exhibit a faster response by using a shorter polymerization time. However, such ultrathin films are flaky and much less structurally stable than the 2D-microelectrode-arrays polyanilines. Thus, the use of a 2D-microelectrode-array polyaniline electrode (as demonstrated here) or three-dimensional arrays (in general) is the best way to improve the response time.

No substantial difference concerning coulomb/voltage, CV curves, response time, or intensity of color change was observed before or after removing the photoresist. This result implies that the observed faster response time is most likely provided by faster ion transport within the polymer matrix.

Photolithographically patterning three-dimensional microelectrode arrays (on the order of 10 micrometers of a conductive polymer using polypyrrole and polyaniline is described in the Examples. An improved electrochemical reversibility of such an electrode (which would be particularly attractive for battery application) and an improved response time for electrochromic application are demonstrated. On such arrays, the polymer chains can be well aligned into narrow micropoles, yielding a better morphology that facilitate the counterion transport within the conductive polymer.

Three-Dimensional Microelectrode Arrays of Polyaniline/Tosylate—Three-dimensional microelectrode arrays of an electronically conductive polymer, polypyrrole, using photolithography were made. Arrays consisting of polypyrrole micropoles approximately 10 μm in diameter and approximately 5 μm high are fabricated. This is the first time a three-dimensional micropolymer structure is fabricated in a well-organized array using a photolithography technique. The polypyrrole three-dimensional array electrode shows an improved electrochemical reversibility, which is particularly useful for battery and electrochromic applications. The application of our photolithography process to polyaniline to fabricate a three-dimensional conductive polymer structure is limited at first by the fact that polyaniline partially dissolves when acetone is applied to remove the photoresist. Thin films of polyaniline in two-dimensional arrays were fabricated and the films showed improved switching times for the electrochromic application.

A preliminary compatibility study was performed of polyaniline/tosylate film and some basic chemicals and solvents used in the lithographic processing is described below.

Three-Dimensional Microelectrode Arrays of Self-Doped Polyanilines—The fabrication procedure is outlined below. (Also see FIGS. 2A to 2D).

A smooth ceramic (99.6% aluminum oxide substrate, Kyocera Type A493) is used as the substrate. A chromium adhesion layer of approximately 500 Å is deposited first, followed by approximately 6000 Angstroms of platinum, sputtered in a vacuum of $2 \times 10^{-6}$ torr with the substrate being water-cooled. The metallized substrate is then coated with about 5 $\mu$m of Shipley 1650 micropositive resist. The microelectrode patterning to form a two-dimensional platinum microwell array in the photoresist layer is done by conventional photolithography using a piece of 1000-mesh nickel screen as the mask. Each platinum "microwell" not covered by the photoresist layer is approximately $20 \times 20$ $\mu$m. The exposed individual platinum microwells are electrically connected through the platinum layer on the substrate and are separated and insulated by the photoresist.

The three-dimensional microelectrode arrays of self-doped polyanilines are prepared using tosylate (p-toluenesulfonic acid) or trifluoromethanesulfonic acid (TFMSA). FIG. 13 shows a set of scanning electron micrographs. Three-dimensional structures are fabricated, however, the aspect ratio of the electrodes is poor because the self-doped polyanilines grew so fast—because of their high conductivity—that they immediately grew over and completely covered the photoresist layer. When the photoresist layer is removed in acetone under an ultrasonic agitation, most of the polyaniline layer is removed with the photoresist, and only an ultrathin layer is left on the substrate. In addition, it is possible that the self-doped polyanilines are partly attacked by acetone during the photoresist removal process.

Electron Beam Lithogrography—The application of this photolithography process to polyaniline to fabricate a three-dimensional (3D) conductive polymer structure was limited at first by the fact that polyaniline partially dissolves when acetone is applied to remove the photoresist. Nevertheless, thin films of polyaniline in two-dimensional arrays, were produced showing improved switching times for the electrochromic application.

More sophisticated 3D microelectrode arrays of a self-doped polyaniline by photolithography and by electron-beam lithography were fabricated. FIG. 1 illustrates one embodiment of a 3D microelectrode array of an electronically conductive polymer. On such a micro-array structure, the polymer chains align into narrow micropoles, which give rise to an improved counter ion transport within the conductive polymer and more available active reaction sites (electrochemical surface area), resulting in improved electrochemical reactivity.

A preliminary compatibility study of polyaniline/tosylate (PAN/Ts) film and some basic chemicals and solvents used in lithographic processing were evaluated. FIG. 9 is a schematic of an electron-beam lithography system. In electron-beam lithography, polymethylmethacrylate is most commonly used as a positive resist. Polymethylmethacrylate was painted on a PAN/Ts film, and the sample was then baked in an oven at 160° C. for 30 minutes. After an ultrasonic cleaning in acetone for 5 minutes, all the layer of polymethylmethacrylate present was removed, leaving the PAN/Ts film intact. This result demonstrates that the intrinsic chemical stability of the PAN/Ts film is superior to that of conventional undoped polyanilines. It also demonstrates that it is possible, using electron-beam lithography and conventional photolithography, to fabricate three-dimensional microelectrode arrays of the PAN/Ts useful as a battery electrode. The use of electron-beam lithography makes it possible to fabricate arrays of microelectrodes on the order of 1 micrometer or less in diameter in a controlled, reproducible fashion.

New microelectronic fabrication processes are performed for three-dimensional-microelectrode arrays of a self-doped polyaniline in small dimension (<5 $\mu$m) using electron-beam lithography with polymethylmethacrylate as a resist (i.e. three-dimensional submicron arrays) and using photolithography with a regular positive photoresist.

The projected advantages of using such three-dimensional arrays in small dimension for electrochemical applications (including a battery) are:

1. The smaller size and greater degree of symmetry of the arrays will allow a closer packing of the molecular chains, thereby enabling a greater degree of interchain electron transfer (and proton transfer for the self-doped polyaniline).

2. The overall rate of ion transport (e.g., H$^+$ ions) in solution will be enhanced through three-dimensional nonlinear diffusion at the three-dimensional submicron arrays.

These results demonstrate the fabrication of three-dimensional arrays of electrically self-doped polyanilines in submicron size, as well as the fast mass-transfer process at the electrode. However, new masks will reduce the pattern geometries and increase densities. The reproducibility of hole size for the polymethylmethacrylate patterns is enabled herein.

The advantages of the well-defined, three-dimensional arrays of electrically conductive polymer over the conventional compact, smooth, conductive polymer films of the art having film-like morphology are:

1. The smaller size and greater degree of symmetry of the arrays will allow a closer packing of the molecular chains, thereby enabling a greater degree of interchain electron transfer (and proton transfer for the self-doped polyaniline), resulting in higher rates of charge transfer than the conventional conductive film.

2. The overall rate of ion transport (e.g. H$^+$ ions) in solution will be enhanced through three-dimensional lateral (nonlinear) diffusion.

3. For battery applications, the three-dimensional arrays can be made into arrays of cylinder electrodes suitable for battery applications because of a large electrochemical surface area (i.e., charge capacitor) with the enhanced ion transport within the polymer chains and at the polymer (electrode)/electrolyte interface.

4. For electroanalytical (and electrochromic) applications, the three-dimensional arrays, when made thin with the polymethylmethacrylate layer left on the metal film to minimize electrode capacitance, should exhibit a high signal-to-background (noise) ratio and also exhibit a fast response time. The diffusion-controlled faradaic signal is proportional to the total geometric area while the background current, capacitive current, is proportional to only the active element area.

The lithographic fabrication technology is applicable to other conductive polymers, such as polypyrrole. By controlling fabrication parameters (e.g., polymethylmethacrylate layer thickness), electrochemical polymerization time, and etching conditions (e.g., time) of polymethylmethacrylate, it is possible to tailor the three-dimensional submicron arrays of conductive polymers for a variety of applications, including:

1. Polymer battery electrodes in general.

2. Polymer battery electrodes in a flexible, thin-film battery.

3. Electrochromic devices.

4. Novel amperometric enzyme-entrapped conductive polymer electrode for biosensor applications (e.g., glucose sensor).

5. Microelectronic or molecular-electronic devices.

The following Examples are provided to further explain and describe the present invention. They are not to be construed as being limiting in any way.

EXAMPLE 1

FABRICATION PROCESSES FOR THREE-DIMENSIONAL MICROELECTRODE ARRAYS OF SELF-DOPED POLYANILINES

The basic fabrication procedure is the same as the one illustrated in FIG. 2. The new processes (Types 2A and B) being developed are as follows:

A. Type 2A (Electron-Beam Lithography)

(a) coat 1 in.×1 in. glass substrates with a sputtered 6000-Å layer of platinum. (Type 2A substrates were cut into ½"×½" squares to fit into the exposure system);

(b) spin on 6000 Angstroms of polymethylmethacrylate (KTI PMMA 950K 4% solvent) and bake in air at 170° C. for 30 minutes;

(c) expose the polymethylmethacrylate films in an electron-beam exposure system using a piece of 2000-mesh copper screen and develop in 1:1 MIBK-isopropanol, followed by an isopropanol rinse. The resulting resist patterns were 7500-Å wide with 6-μm center-to-center spacing. No hard bake is required for the polymethylmethacrylate;

(d) the PAN is next electrochemically deposited on the polymethylmethacrylate; and (e) remove the polymethylmethacrylate (or photoresist in Type 2B) in an ultrasonic acetone bath.

B. Type 2B (Photolithography)

The basic procedures for Type 2B are as given for Type 2A with the following two exceptions:

step (b) is replaced by (b') spin on 6000 Å of KTI 1350 positive resist and soft baked at in air 80° C. for 30 minutes.

step (c) is replaced by (c')Expose the resist to ultraviolet light using a piece of 2000-mesh copper screen and develop in an aqueous developer (a mixture of KTI 351 positive resist developer and deionized water at 1:4 ratio), followed by a deionized water rinse. The resulting pattern consists of 6-μm holes with 8-μm center-to-center spacing. Hard bake the sample in air at 120° C. for 30 minutes.

FIG. 12 shows the resulting resist patterns of Types 2A and 2B described hereinabove. The gray dots represent the exposed platinum. It is difficult to take scanning electron micrographs of the polymethylmethacrylate patterns with a sharp focus because of charge build-up on the surface.

Polyaniline/tosylate film is electrochemically polymerized on Type 2A electrode by cycling potential between −0.2 V and +0.8 V vs. SCE at a scan rate of 10 mV/s for 10 minutes in an aqueous solution continuing 0.1 M aniline and 1 M tosylate. FIG. 16 shows the scanning electron micrographs of the resulting three-dimensional submicron electrode arrays (the diameter of each electrode is about 0.3 μm). This is the first successful submicron-size three-dimensional conductive-polymer structure fabrication using electron-beam lithography or photolighography.

Fabrication of Three-Dimensional Submicron Arrays of Self-Doped Polyanilines Using New Processes With Electron-Beam Lithography and Polymethylmethacrylate Resist—The basic fabrication procedure is the same as the one illustrated in FIG. 2. New processes (Types 2a and 2b) also developed during the first set of experiments are found in Example 2.

EXAMPLE 2

FABRICATION OF THREE-DIMENSIONAL SUBMICRON ARRAYS OF SELF-DOPED POLYANILINES USING A MODIFIED PROCESS WITH ELECTRON-BEAM LITHOGRAPHY AND POLYMETHYLMETHACRYLATE RESIST

Three-dimensional submicron arrays of a self-doped polyaniline fabricated using a modified process, Type 2c. The polymer was electrochemically grown on a platinum-coated glass substrate that was micropatterned with polymethylmethacrylate (PMMA) prior to the electrochemical polymerization. The density of the three-dimensional microstructure was greatly increased by the repeated exposure of the PMMA film in the electron-beam exposure system. Depending upon applications, polymethylmethacrylate, which serves as an insulating layer, can be completely or partly removed.

Type-2C Procedure—The following description outlines the basic fabrication procedure (which is basically the same as Type 2A above).

Step 1: Coat 1 in.×1 in. glass substrates with a sputtered 6000 Angstrom layer of platinum (or gold).

Step 2: Physically cut the substrates into 0.5×0.5 in. squares to fit into the electron-beam-exposure system.

Step 3: Spin on 2 micrometers of polymethylmethacrylate (polymethylmethacrylate: KTI 950K 6% solvent) and bake at 170° in air for 30 minutes.

Step 4: Expose the polymethylmethacrylate films in an electron-beam-exposure system (step and repeat 16 times) using a 2000-mesh copper screen, and develop in 1:1 methyl isobutyl ketone (MIBK)-isopropanol, followed by an isopropanol rinse. The resulting resist patterns are 2 micrometers wide with 12.7 micrometers center-to-center spacing. No hard bake is required for the polymethylmethacrylate.

Step 5: Electrochemically grow polyaniline films as shown schematically in FIG. 12.

Step 6: After polyaniline film has been grown, remove the polymethylmethacrylate resist in an acetone bath with or without ultrasonic agitation. The resulting polyaniline pattern on platinum is shown schematically in FIG. 12.

Optimization of Electrochemical Synthesis Conditions—Three-dimensional submicron arrays of PAN/Ts and PAN/TFMSA were fabricated. Table 2 summarizes typical electrochemical synthesis conditions used. All the self-doped-polyaniline films were grown using a potential-cycling method. However, scanning electron microscopy showed that the exact nature and shape of the resulting three-dimensional submicron structures depends critically on the following:

1. The kind of metal layer (platinum or gold) deposited on the glass substrate in conjunction with the kind of starting monomer (Ts or TFMSA).

2. Total number of coulombs passed during the synthesis.

3. Conditions to remove the polymethylmethacrylate layer in an acetone bath after the polymer is grown.

TABLE 2

ELECTROCHEMICAL SYNTHESIS CONDITIONS OF SELECTED THREE-DIMENSIONAL SUBMICRON ARRAYS OF SELF-DOPED POLYANILINES

| | | Preparation Method | | | | | |
|---|---|---|---|---|---|---|---|
| Electrode | Substrate | Starting Monomers* | Potential Range (V vs SCE) | Scan Rate (V/s) | Time (h) | Total (Coulomb) | Comments |
| PAN-P8 | Type 2c gold | 0.1M An/ 1M Ts | −0.2 +0.8 | 100 | — | (2.2) | No film growth |
| PAN-P9 | Type 2c gold | 0.1M An/ 1M TFMSA | −0.1 +0.9 | 100 | 1.5 | 1.35 | Too thick film |
| PAN-P11 | Type 2c platinum | 0.1M An/ 1M TFMSA | −0.1 +0.9 | 100 | 1.5 | 0.3 | Overgrown film |
| PAN-P12 | Type 2c platinum | 0.1M An/ 1M Ts | −0.2 +0.8 | 100 | 1.2 | 0.37 | Too thick film |
| PAN-P14 | Type 2c platinum | 0.1M An/ 1M Ts | −0.2 +0.8 | 100 | 1.0 | 1.3 | Slightly overgrown film |
| PAN-P15 | Type 2c platinum | 0.1M An/ 1M Ts | −0.2 +0.8 | 100 | 0.8 | 0.05 | Best film |

*An = aniline; Ts = Tosylate (toluenesulfonic acid); TFMSA — trifluoromethanesulfonic acid.

The best reproducible results were obtained with the combination of platinum and polyaniline/tosylate and when the polymethylmethacrylate layer was washed in an acetone bath for 2 to 3 minutes without any ultrasonic agitation. FIGS. 13A, 13B, 13C and 13D show scanning electron micrographs of three-dimensional submicron arrays of polyaniline/tosylate (PAN-P15) fabricated using a polymethylmethacrylate pattern with uniformly distributed holes with a uniform hole size of 2 micrometers. When the polymethylmethacrylate pattern had closely spaced, unusually large holes (3 to 3.5 micrometers), the resulting three-dimensional arrays of polyaniline/tosylate did not have a well-defined structure (see the scanning electron micrograph of film PAN-P14 in FIGS. 14A, 14B, 14C and 14D.

Cyclic voltammetry was applied to the PAN-P15 electrode before the polymethylmethacrylate was removed (FIG. 15). The anodic peak current, $i_p$, which corresponds to the doping process, is plotted against the sweep rate, v, in FIG. 16. The electrode exhibits a fast mass-transport process (of H+ ions) because $i_p$ is proportional to v (i.e., kinetic control mechanism). The observed fast mass-transfer process probably results from the enhanced ion transport through three-dimensional lateral (nonlinear) diffusion at the individual microelectrodes.

While only a few embodiments of the invention have been shown and described herein, it will become apparent to those skilled in the art that various modifications and changes can be made in the components and process to produce a thin film three-dimensional microelectrode of an electrically conductive polymer having an organized array of substantially identical microprotrusions and the microelectrode produced thereby without departing from the spirit and scope of the present invention. All such modifications and changes coming within the scope of the appended claims are intended to be carried out thereby.

We claim:

1. A three-dimensional microelectrode of an electrically conductive polymer comprising polyaniline having a continuous surface comprising a well organized array of multiple micron or submicron substantially identical micro protrusions wherein each protrusion has a height of between about 0.3 and 50 micrometers and a top surface area of up to about 0.25 and 2500 square micrometers of conductive polymer on top of and in contact with a substantially smooth electrically conducting surface, said microelectrode having improved electrical charge storage capacity.

2. The three-dimensional microelectrode of claim 1 wherein the electrically conductive polymer is produced in situ by electrochemical polymerization means creating the multiple microprotrusions.

3. The three-dimensional microelectrode of claim 2 wherein the electrically conductive polymer comprises multiple protrusions as a thin film polymer of polyaniline having a height of about 0.3 micrometers and a top surface area of about 225 square micrometers.

4. The three-dimensional microelectrode of claim 3 wherein the polymer is polyaniline doped with an organic sulfonic acid.

5. A method to produce a thin film three dimensional microelectrode of an electrically conductive polymer selected from polyaniline or polypyrrole having one surface comprising an organized array of multiple micron or submicron substantially identical microprotrusions wherein each protrusion has a height of between 0.3 and 50 micrometers and a top surface area of between about 0.25 and 2500 square micrometers of conductive polymer in contact with a substantially smooth electrically conducting surface, which method comprises:

(a) depositing at least one conductive metal thin film on an essentially smooth electrically insulating surface substrate, (b) depositing a thin film of a micropositive resist on the surface of the at least one electrically conductive metal thin film, (c) subjecting the combination of step (b) to photolithography or electron beam lithography conditions through a mask positioned over the surface of the resist to produce a metallic microwell, (d) electrochemically polymerizing an electrically conductive monomer and optionally an organic dopant onto the conducting metal creating an array of electrically conductive polymer microprotrusions within the photoresist, and (e) removing the photoresist to produce the organized three dimensional microelectrode array of the electrically conductive polymer protrusions in electrical contact with the electrically conductive thin film surface creating an integral electrically conducting surface.

6. The method of claim 5 wherein the electrically conductive polymer of step (d) is selected from polypyrrole or polyaniline.

7. A thin film three dimensional microelectrode of an electrode conductive polymer produced by the method of claim 6 wherein the polymer comprises polyaniline.

8. The microelectrode of claim 7 wherein the polymer comprises polyaniline doped with an organic sulfonic acid.

9. The microelectrode of claim 8 wherein the sulfonic acid is paratoluenesulfonic acid.

10. The thin film three dimensional microelectrode of an electrode conductive polymer produced by the method of claim 5.

11. The method of claim 5 wherein in step (d) the polymer is electrochemically polymerized using a constant current.

12. The method of claim 5 wherein in step (d) the polymer is electrochemically polymerized using a constant potential.

13. The method of claim 5 wherein in step (d), the polymer is electrochemically polymerized using a cyclic potential.

14. A three dimensional microelectrode of an electrically conducting polymer having one surface comprising a well organized array of micron or submicron substantially identical protrusions wherein each protrusion has a height of between about 0.3 and 50 micrometers and a top surface area of between about 0.25 and 2500 square micrometers from the surface of the substantially smooth electrically conducting surface, wherein the polymer consists essentially of polyaniline doped with a dopant containing at least one sulfonic acid group wherein said polymer has improved charge storage capacity.

15. The microelectrode of claim 14 wherein the dopant is selected from benzenesulfonic acid, toluenesulfonic acid, methanesulfonic acid or trifluoromethylsulfonic acid.

16. The three-dimensional microelectrode of claim 14 fabricated by a photolithographic or electron beam lithographic method, which method comprises:
 (a) depositing at least one conductive metal thin film on an essentially smooth substrate creating a smooth metal film surface,
 (b) depositing a thin film of a micropositive resist on the surface of the least one conductive metal thin film,
 (c) subjecting the combination of step (b) to photolithography or electron beam lithography conditions with a mask to produce a metallic microwell,
 (d) electrochemically polymerizing an electrically conductive polymer and optionally an organic dopant onto the electrically conducting metal, and
 (e) removing the photoresist to produce the organized three dimensional microelectrode array of protrusions of the electrically conductive polymer in contact with the electrically conducting surface.

17. The microelectrode of claim 16 wherein the electrically conducting polymer is polyaniline.

18. The microelectrode of claim 17 wherein the dopant is p-toluenesulfonic acid.

19. The microelectrode of claim 18 wherein in step (c) photolithographic conditions are used.

20. The microelectrode of claim 18 wherein in step (c) electron beam lithographic conditions are used.

* * * * *